United States Patent [19]

Lai et al.

[11] Patent Number: 5,242,012
[45] Date of Patent: Sep. 7, 1993

[54] APPARATUS AND PROCESS FOR COOLING FLUID SOLID PARTICLES

[75] Inventors: Zhouping Lai; Hongyan Liu; Qiye Yang; Ziliang Liu, all of Beijing, China

[73] Assignee: Beijing Design Institute, Beijing, China

[21] Appl. No.: 658,719

[22] Filed: Feb. 21, 1991

[30] Foreign Application Priority Data

Mar. 7, 1990 [CN] China ............................ 90101048.0

[51] Int. Cl.⁵ ............................ F28C 3/16; B01J 38/32
[52] U.S. Cl. ................................ 165/104.16; 122/4 D; 122/244; 122/321; 432/83; 502/44
[58] Field of Search ............... 165/104.16; 122/244, 122/273, 331, 321-323, 4 D; 432/78, 80, 83; 502/44

[56] References Cited

U.S. PATENT DOCUMENTS

| | | | |
|---|---|---|---|
| 2,518,270 | 8/1950 | Barr | 165/104.16 |
| 2,995,426 | 8/1961 | Keith | 165/104.16 |
| 3,013,773 | 12/1961 | Campbell et al. | 165/104.16 |
| 4,160,743 | 7/1979 | Kelley . | |
| 4,176,710 | 12/1979 | Gansauge et al. | 165/104.16 |
| 4,353,812 | 10/1982 | Lomas et al. . | |
| 4,364,849 | 12/1982 | Vickers et al. . | |
| 4,396,531 | 8/1983 | Lomas . | |
| 4,424,192 | 1/1984 | Lomas et al. . | |
| 4,434,245 | 2/1984 | Lomas et al. . | |
| 4,438,071 | 3/1984 | Vickers et al. . | |
| 4,439,533 | 3/1984 | Lomas et al. . | |
| 4,483,276 | 11/1984 | Lomas et al. . | |
| 4,578,366 | 3/1986 | Cetinkaya et al. . | |
| 4,582,120 | 4/1986 | Walters et al. . | |
| 4,605,636 | 8/1986 | Walters et al. . | |
| 4,614,726 | 9/1986 | Walters et al. . | |
| 4,698,212 | 10/1987 | Walters et al. . | |
| 4,710,357 | 1/1987 | Cetinkaya et al. . | |
| 4,716,958 | 1/1988 | Walters et al. . | |
| 4,757,039 | 7/1988 | Lomas . | |
| 4,822,761 | 4/1989 | Walters et al. . | |
| 4,881,592 | 11/1989 | Cetinkaya . | |

OTHER PUBLICATIONS

"Design of Internal Heat Remover Used in a Fluid Catalytic Cracking Apparatus"; *Petroleum Processing* No. 5, 1987, Beijing, China-No Translation.

*Primary Examiner*—Albert W. Davis, Jr.
*Attorney, Agent, or Firm*—Armstrong, Westerman, Hattori, McLeland & Naughton

[57] ABSTRACT

An arrangement of apparatus and process thereof for cooling hot fluid solid particles, especially hot regenerated catalytic particles are disclosed. The apparatus comprises a substantially vertical, cylindrical and close ended heat removal vessel through the shell side passage of which is passed the fluid solid particles that flow downwardly in the form of dense phase fluidized bed, and one or more separate heat exchange tube units through the tube side passage of which the coolant is passed and vaporized, each of said heat exchange tube units comprising a supply coolant inlet tube, a supply coolant collecting chamber, one or more heat exchange tubes, a vapour collecting chamber and a resulting vapour discharge tube, all of which constitute a close type coolant-to-vapour circulation. The apparatus and process of the present invention is particularly adequate to be utilized in combination with a catalyst regeneration operation in a fluid catalytic cracking operation of heavy residual oil feedstock for the conversion thereof into lighter and more valuable products.

14 Claims, 3 Drawing Sheets

APPARATUS AND PROCESS FOR COOLING FLUID SOLID PARTICLES

FIELD OF THE INVENTION

The field of art to which the present invention pertains is heat transfer between fluid solid particles and a heat exchange medium. In particular, this invention relates to an arrangement of apparatus and process thereof for cooling fluid solid particles. More particularly, the invention is concerned with an apparatus and process for the external removal of a portion of heat of hot regenerated catalytic particles from a catalyst regeneration vessel in which the catalytic particles have been regenerated in a combustion zone and will be recycled to a reaction zone for the conversion of residual fractions of crude oils to lighter and more valuable hydrocarbons.

DESCRIPTION OF THE PRIOR ART

The fluid catalytic cracking process (hereinafter referred to as "FCC" process) has been universally used for the conversion of vacuum gas oil or more heavier materials to lighter products. The FCC process comprises the steps such as catalytic cracking reaction, catalyst regeneration, separation of the catalyst from the flue gas and recovery or removal of excess heat generated in the catalyst regeneration from a regeneration vessel. The vacuum gas oil or more heavier materials, which are used as feedstock of an FCC reaction vessel are brought into contact with fresh or regenerated catalysts wherein the cracking reactions take place under cracking conditions such that the heavy feedstock is catalytically broken down or cracked into lighter or more valuable products. In so processing, the heavy feedstock undergoes the cracking reactions and the resulting deactivating materials, such as carbonaceous deposits or coke, are accumulated upon the surface of the catalyst which, as a result, is deactivated so as not to be able to catalyze the successive cracking reactions further. This catalyst must be regenerated for the restoration of catalytic activity before it is recycled for the reuse and therefore is hereinafter referred to as "catalyst to be regenerated or spent catalyst". In order to activate the catalyst to be regenerated, it may be passed into a combustion chamber wherein it is admixed with air or oxygen containing gas. At an elevated temperature, the carbonaceous deposits accumulated upon the surface of the catalyst are burnt so that the activity of the catalyst could be restored. The catalyst from which the carbonaceous deposits are substantially reduced by the combustion thereof is referred to as "regenerated catalyst or activated catalyst".

The admixture of regenerated catalyst and flue gas is separated in a cyclone. The high temperature flue gas takes over a portion of thermal energy exiting in the regeneration vessel and is subsequently discharged to an energy recovery system. The regenerated catalyst is transferred to a reaction zone and again brought into admixture and contact with the fresh feedstock, and the successive cracking reaction so begins again. The tendency to form the deactivating carbonaceous deposits or coke on the catalyst surface in an FCC operation increases when the feedstock becomes heavier. The quantity of heat generated in burning the so formed carbonaceous deposits will exceed that required for the reaction zone. It is then accordingly necessary to transfer at least a portion of the regenerated catalyst into a catalyst cooler for releasing the excess heat in order to maintain the thermal equilibrium in an FCC apparatus or process.

Recently, there is more and more great demand for lighter oil products as the petrochemical industry develops. The feedstock for an FCC operation would involve the heavier residues, correspondingly. The chemical nature and molecular structure of the feedstock will affect the level of coke surface-deposited upon the catalyst. Generally speaking, the higher the molecular weight of the feedstock, the higher the level of the Conradson carbon (ASTM Method D189) and the larger will be the quantity of the deactivating carbonaceous deposits formed in an FCC operation. The larger amount of carbonaceous deposits accumulated upon the surface of the catalyst will release more thermal energy when combusted in a combustion zone of regeneration vessel with an oxygen containing gas. In general, the level of surface-deposited carbonaceous material or coke in a catalytic cracking reaction zone to which the vacuum gas oil is fed as feedstock is less than 6.5%. With this level of coke, the quantity of heat generated in a catalyst regeneration vessel with an oxygen containing gas will be absorbed in the reaction section, thereby providing the ability to maintain the thermal equilibrium in an FCC operation. When the feedstock to an FCC operation becomes heavier, the level of carbonaceous deposits or coke formed will exceed 6.5%, for example 6.5-15%. The quantity of heat generated when the catalyst to be regenerated is combusted with an oxygen-containing gas will be more than required for the performance of the cracking reaction, for example in a riser type reactor. This will then result in surplus of heat and an increase of the temperature in a reaction-regeneration system. Normal operation conditions will be disrupted. The release or removal of surplus thermal energy will be accordingly needed for the maintenance of a normal operation temperature.

The methods for the release or removal of excess heat from the catalyst regeneration vessel are generally internal and/or external heat exchange operations vis a vis the regeneration vessel. That is to say, the heat removal is carried out within the means internal and/or external to the catalyst regeneration vessel.

In an internal heat removal operation vis a vis the regeneration vessel, the cooling coils are provided within the regeneration vessel. These cooling coils may be substantially horizontally or vertically arranged inside the dense phase bed of regenerated catalyst particles. The outer surface of these cooling coils is directly contacted with the catalyst being regenerated. The supply water is passed through the cooling coils for the absorption of excess heat generated during the combustion of the carbonaceous deposits and then evaporated into steam. At the same time, the regenerated catalyst is cooled and thus the temperature of the reaction-regeneration system may be controlled as being within the prescribed range. In the prior art in this regard, there may be mentioned the present inventor's article entitled "Design of Internal Heat Remover Used in a Fluid Catalytic Cracking Apparatus". PETROLEUM PROCESSING, No. 5 (1987), BEIJING, and early patents, for example U.S. Pat. No. 4,160,743 to Kelley and others which are incorporated herein by reference.

The greatest disadvantage of the internal heat removal method is shown by the fact that the quantity of heat to be removed is difficult to be precisely controlled. Due to such an incontrollability of the heat removal, the internal heat remove method has not been applicable to an FCC apparatus or process in which the feedstock is usually varied. For this reason, there have been provided a variety of external heat remove methods which are proposed vis a vis the internal heat removal methods. There have been many prior art patents in this regard, for example U.S. Pat. Nos. 2,395,106 to Day et al., 2,515,156 to Jahnig et al., 2,492,948 to Berger, 2,735,802 to Jahnig, 2,862,798 to Mckinney, 2,873,175 to Owens, 2,970,117 to Harper, 4,353,812 to Lomas et al., 4,364,849 to Vickers et al., 4,396,531 to Lomas, 4,424,192 to Lomas et al., 4,434,245 to Lomas et al., 4,438,071 to Vickevs et al., 4,439,533 to Lomas et al., 4,483,276 to Lomas et al., 4,578,366 to Cetinkaya et al., 4,582,120 to Walters et al., 4,605,636 to Walters et al., 4,614,726 to Walters et al., 4,698,212 to Walters et al., 4,710,357 to Cetinkaya et al., 4,716,958 to Walters et al., 4,757,039 to Lomas, 4,822,761 to Walters et al., and 4,881,592 to Cetinkaya and others which are also incorporated herein by reference.

However, these external heat removal means suffer from certain serious disadvantages which, among others, may be generalized as stated hereinbelow.

(1) A plurality of heat remove tubes are connected to one tube sheet to perform indirect heat exchange between hot fluid solid particles and a heat exchange medium. In the operation procedure, when one of these tubes is broken down due to, for example, wear and tear, poor welding, being locally overheated or tube wall metal ineffectiveness, the cooling medium will be spattered at a location of leakage into the shell passage of the external heat removal system. This type of external heat remove system is an integrate construction. That is to say, any effective portion thereof can not be isolated. In case of any breakdown occurring in a heat removal operation, all the external heat removal system must be stopped. It may be, therefore, concluded that this type heat removal system is not flexible or saying poor in security and reliability.

(2) A plurality of heat exchange tubes and water supply tubes are connected with two tube sheets to carry out an indirect heat exchange operation. The tube sheet chamber bears a pressure of up to 4.5 MPa. As such, this type of tube sheet arrangement causes certain disadvantages which prove to be difficult to overcome. Firstly, the tube sheet is very thick. For example, an external heat removal system having a diameter of 2000 mm will be up to 8000 kg heavy. Accordingly, there will be a considerable consumption of metallic material. Secondly, the sealing of the heat removal system is difficult to be maintained ascribable to a big tube sheet being required and a high pressure being maintained. Thirdly, the thickness of the tube sheet will be rapidly increased as the diameter of the heat removal vessel becomes larger. As a result, the heat exchange area of a single external heat removal system is limited to a certain extent. When the released thermal energy increases, more than one external heat removal system should be provided, which will give rise to the difficulty of installation, operation and maintenance.

(3) U.S. Pat. Nos. 4,438,071 to Vickers et al., 4,439,533 to Lomas et al., 4,605,636 to Walters et al., 4,716,958 to Walters et al. and 4,757,039 to Lomas disclose such a type of external heat removal system that the tube sheet chamber is located at the lower end of the external heat removal vessel and the nozzle conduits for fluidizing the catalyst are provided between the heat removal tubes. In this arrangement, since the heat removal tubes are spaced with a little interval, the fluid solid particles that are entrained with the air supplied via the nozzle conduits will wear and tear the heat exchange tubes. In case something is broken down at the heat removal tubes, the external heat remove systems will leak or spatter the cooling medium being passed within the tube side.

(4) In the above mentioned external heat removal systems, the supply water is delivered upwardly and the mixture of steam and water flows downwardly. However, the local resistance will increase as the vapor bubbles accumulate within the downward passage because the vapor bubbles tend to float upwardly. The quantity of water to be passed through and evaporated will be importantly reduced so that the evaporation will be aggravated. The vicious cycle will occur and the heat exchange tubes will be locally overheated and rapidly broken down. The irregularity usually occurs in the parallel-arranged tubes. This will result in the hydraulical unreliability which becomes more and more important and has been remained unsolved. In general, these heat removal system designs and their variational embodiments should be avoided.

(5) U.S. Pat. Nos. 4,353,812 to Lomas et al. and 4,424,192 to Lomas et al., describe an external heat removal system comprising a tube plate disposed at the upper portion thereof. In this type of external heat removal system, the fluidizing gas is supplied via an inlet at the lower portion thereof, and passed through the shell side passage and then recycled to the upstream regeneration vessel at the upper portion thereof. In order to keep an effective height of fluidized bed of solid catalytic particles and to prevent a significant portion of the fluid solid catalytic particles from being backmixed into the regeneration vessel without being heat exchanged or cooled, there should be maintained a predetermined spare height called "TDH" (transport disengaging height) above the bed of the fluidized solid catalytic particles. Accordingly, the utilization factor of heat removal tubes in this type external heat removal system is too low to be economically used in, for example, the petrochemical industry. In a favorable embodiment, in general, the utilization factor of the heat removal tubes disposed within this type of external heat removal system is only about ⅔.

The problem the present invention has been endeavored to solve is to provide a heat exchange arrangement of apparatus for the recovery or removal of at least a portion of thermal energy from hot fluidizable solid particulate material, particularly the regenerated catalytic particles exiting the regeneration vessel schemed in an FCC operation for the processing of the heavy feedstock.

SUMMARY OF THE INVENTION

Accordingly, the present invention is directed to an arrangement of apparatus and process for cooling hot fluid solid particulate material, for example catalytic particles that are being worldwide employed in the petrochemical industry, in particular in a fluid catalytic cracking (FCC) for the conversion of the heavy or high molecular weight feedstock or straight material into lighter or more desirable low molecular weight products. It is particularly concerned with a process and apparatus for the cooling or rather removal of a portion of thermal energy from the hot fluidizable solid particles, especially the hot heavy oil feedstock cracking catalytic particles contaminated with carbonaceous deposits being produced in an FCC operation and combusted with an oxygen containing gas in upstream zones, which process and apparatus can be reliably brought into operation in absence of the aforementioned disadvantages of the prior art internal and external heat removal systems. Exactly speaking, the process and apparatus according to the present invention may be characterized as stated herein after.

(1) The temperature of the fluidized bed of catalytic particles contained in the regeneration vessel can be flexibly, effectively and economically controlled by the variation of the opening of a slide valve and the supply of a fluidizing gas. The thermal loadage that is removed or exchanged may be varied in an extensive range, for example within a range of from 0 to 100%. The process and apparatus in accordance with the present invention may be adapted as a step for the processing of catalytic particles having a carbonaceous deposit or coke of from 6.5% to 15% or higher. That is to say, the process and apparatus in accordance with the present invention may to the greatest extent meet the heat removal or recover requirements for the treatment of various feedstock or starting materials that are different in chemical nature, composition and quantity thereof to be processed.

(2) The external heat removal system employed for cooling the hot fluid solid particulate material and in particular the hot catalytic particles in accordance with the present invention, are peculiar in design and unique in construction thereof. In fact, it comprises a plurality of heat exchange tube units or bundles and a shell. Each of the heat exchange tube units comprises a supply water tube, a water collecting chamber, one or more elongated heat exchange tubes, a vapor collecting chamber and a vapor discharge tube, all of which constitute a separate water-vapor circulation. At the inlet and outlet conduits of the circuit are disposed valves which may be optionally opened or closed at any time. The supply water is transported through the internal or tube side passage of individual heat exchange tube units and heat indirectly exchanged with the high temperature fluid catalytic particles being passed through the shell side passage. The supply water absorbs the thermal energy and evaporizes, thereby forming the mixture of steam/water which is then discharged into the steam drum per the vapor discharge tube. At the same time, the hot catalytic fluid-like particles flow downwardly in the form of a dense phase fluidized bed and is gradually cooled.

(3) The external fluid solid particles especially catalytic particles heat removal arrangement in accordance with the present invention is essentially composed of individual or separate heat exchange tube units. In case any breakdown or leakage or spattering occurs at any tube or any portion thereof the operation of the heat exchange tube unit that is concerned with is then stopped and the normal performance of other heat exchange tube units are by no means affected. The normally operative reliability and feasibility or flexibility of the external heat removal apparatus and process as a whole operation in accordance with the present invention are substantially increased so that the desired fluid catalytic cracking (FCC) operation will undoubtedly become more effective and stable. Accordingly, this type of arrangement of external fluid solid particulates heat exchange system is surprisingly novel and non-obvious.

(4) The external fluid solid particles heat removal process and apparatus in accordance with the present invention are performed in the form of dense phase fluidization wherein by the term "dense phase" as used herein is meant that the mixture of hot catalytic particles and the fluidizing gas has a density of from 100 to 600 kg/m$^3$. The apparent velocity that is attainable in the dense phase fluidized bed of hot catalytic particles ranges from 0.1 m/s to 1.0 m/s and the heat exchange performance will be excellent. The overall heat transfer coefficient will be up to 550 W/m$^2$. K. In other words, these heat exchange performance results that may be obtained in a normal FCC operation using the arrangement of apparatus in accordance with the present invention as cooling means of the regenerated catalyst are much better than those of the conventional FCC operations.

(5) The external heat removal apparatus of the present invention is operated under conditions such that the hot regenerated and substantially carbonaceous deposits free catalytic fluid-like particles flow downwardly in the form of dense phase fluidized bed wherein the rate of flow of the fluid solid particulates, especially the FCC catalytic particles and the apparent velocity of the gas are very low so that the attrition that the fluid solid particles causes upon the heat removal tubes could be minimized. This will result in a service life that is substantially longer than those of the aforementioned conventional FCC arrangements.

(6) The supply water and the resulting vapor collecting chambers provided at the uppermost and lowermost ends of heat exchange tube units extending through the external heat removal vessel according to the present invention are in the form of collecting cylinder conduits which provide the ability to thoroughly utilize the advantages shown by the fact that the cylindrical conduit shell has an excellent pressure resistance, thereby avoiding the problematic manufacture and sealing of plane tubeplate construction. In one embodiment, the vapor discharge tubes associated with individual heat exchange tube units are directly suspended from the top in a manner such that the vapor discharge tubes serve at the same time as the suspension supports of individual heat exchange tube units or bundles. That is to say, the vapor discharge tubes have double functions. Since this type of construction is properly arranged, the consumption of the construction materials, in particular metallic material used for the manufacture of the external heat removal vessel and its associates in accordance with the present invention will be remarkably reduced, for example by approximately 30%, on the basis of the above mentioned U.S. patents.

The other objects and advantages of the present invention will become apparent from the following description and illustrative representation of non-limitative embodiments with reference to the attached drawings, all of which encompass the details for the carrying out of the present invention.

BRIEF DESCRIPTION OF THE DRAWINGS

There are five figures attached to the present specification, which figures are as follows.

Figure 1:
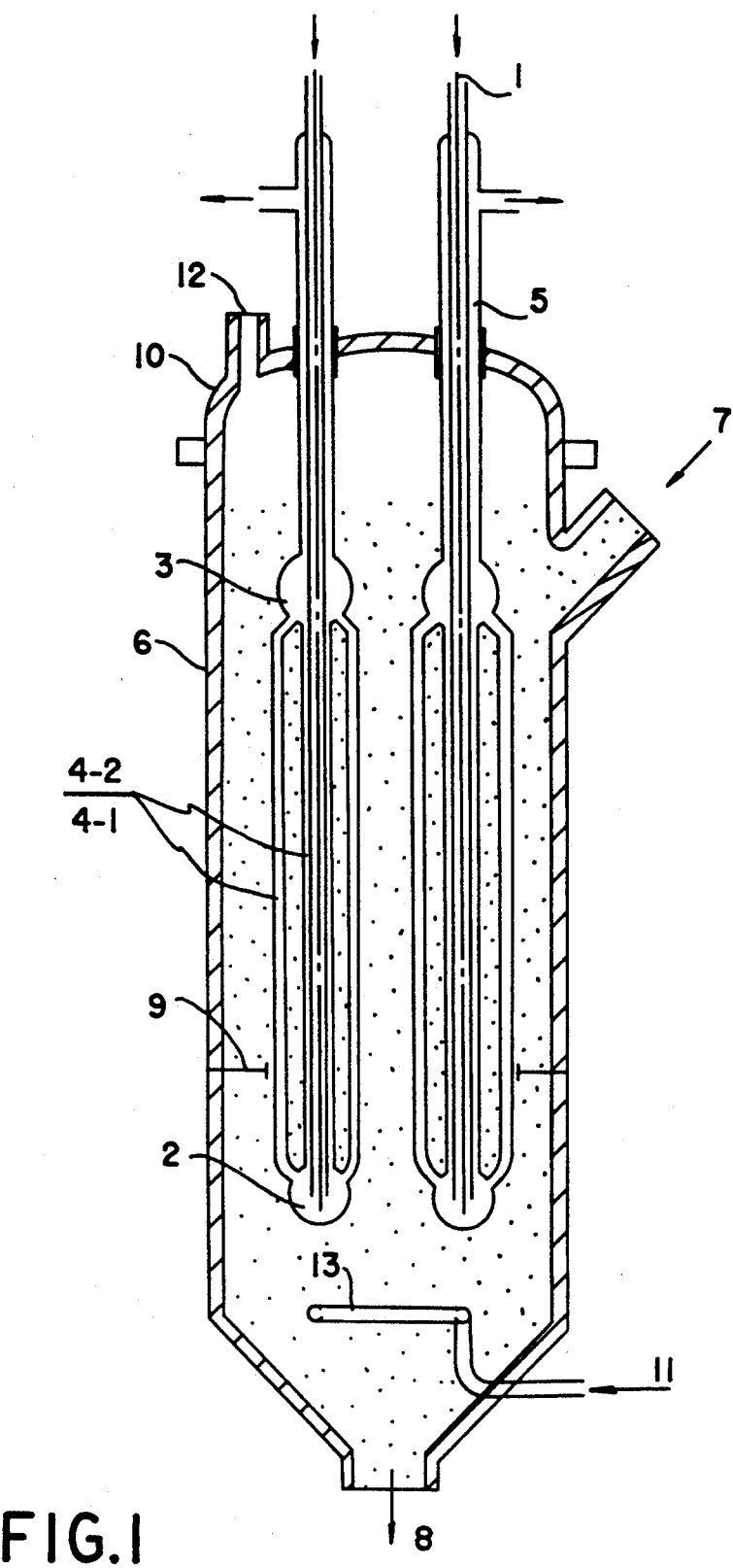
FIG. 1 is a schematic cross sectional sketch in elevational view of the fluid solid particles heat removal apparatus and process thereof in accordance with the present invention.
Figure 3:
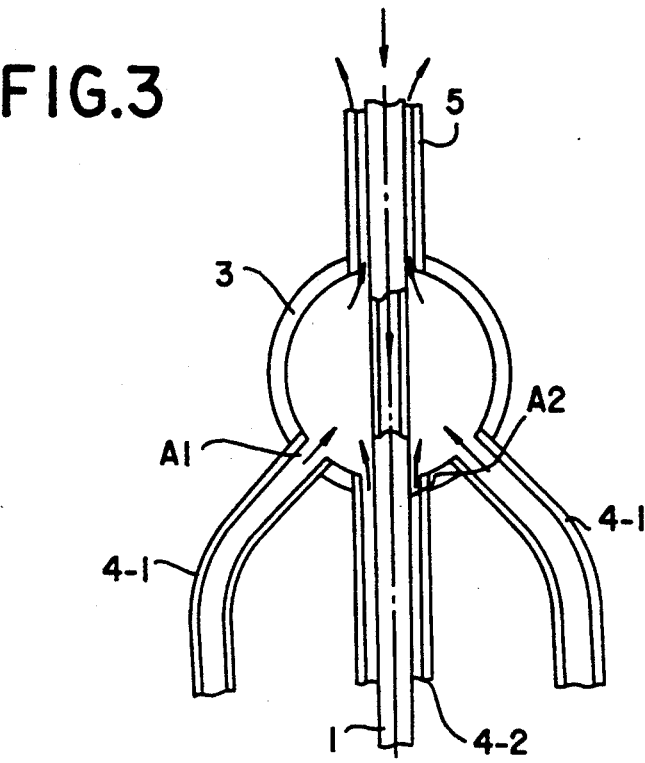
FIG. 3 is a schematic sketch in elevation view of the vapor collecting chamber with their connections in accordance with the present invention.
Figure 2:
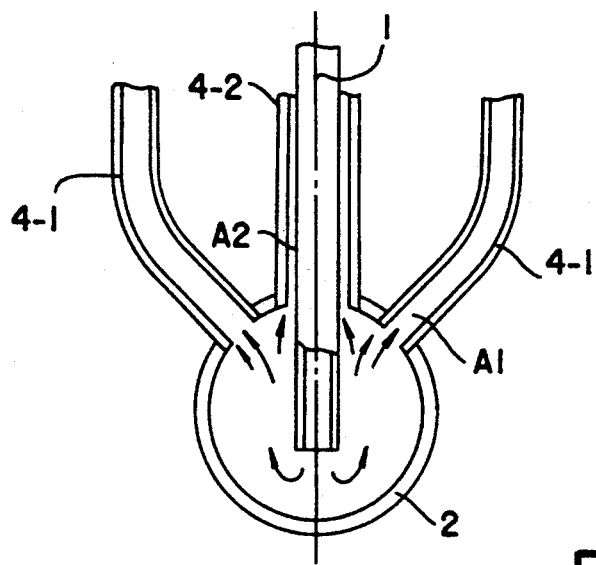
FIG. 2 is a schematic sketch in elevational view of the supply water collecting chamber with their connections in accordance with the present invention.
Figure 5:
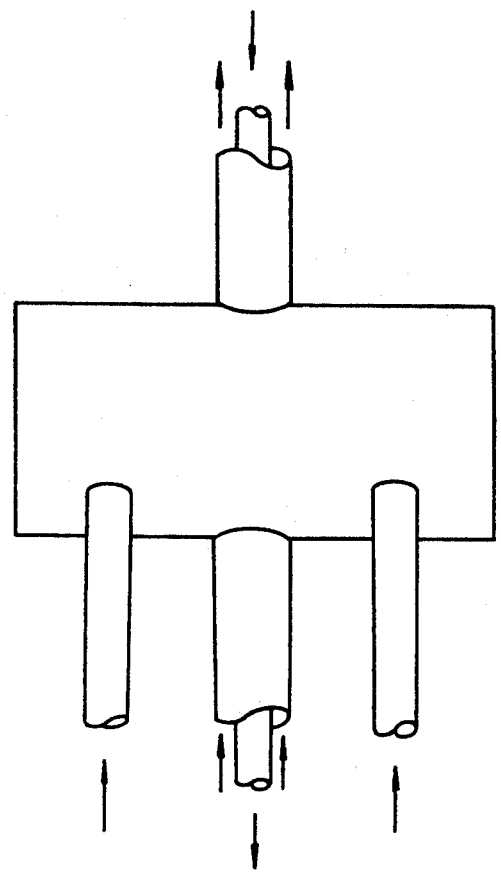
FIG. 5 is a schematic sketch in side view of the vapor collecting chamber with their connections in accordance with the present invention.
Figure 4:
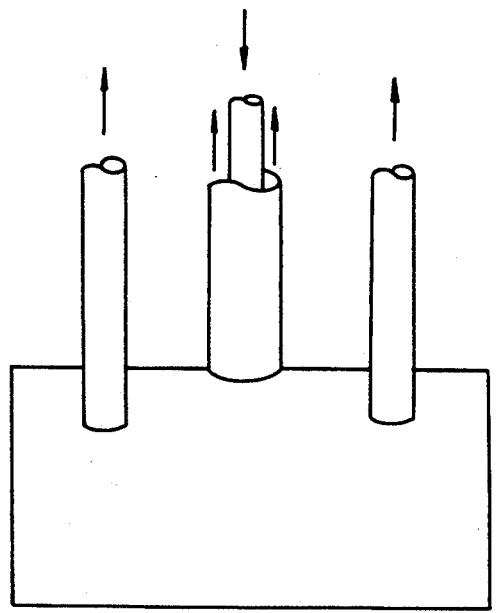
FIG. 4 is a schematic sketch in side view of the supply water collecting chamber with their connections in accordance with the present invention.

These drawings attached hereto are simply aimed at being illustrative of the apparatus and the process thereof in accordance with the present invention and should not be understood to mean any limitation thereon.

DETAILED DESCRIPTION OF THE INVENTION

In one aspect, the present invention provides an arrangement of apparatus for the removal of a portion of thermal energy from hot fluid solid particles, especially the fluid solid catalytic particles upon which have been surface-deposited deactiating carbonaceous materials when used in a fluid catalytic cracking (FCC) operation and then regenerated in a regeneration vessel by the combustion of carbonaceous deposits with an oxygen containing gas, said apparatus comprising in combination:

a. a substantially vertical cylindrical external heat remove vessel, b. one or more individual or separate heat exchange tube units being housed in said cylindrical heat removal vessel, each of said heat exchange tube units comprising a supply water inlet tube, a supply water collecting chamber, one or more heat removal tubes, a steam collecting chamber and a steam discharge tube, c. valves provided at the supply coolant or heat exchange medium, for example water inlet and steam discharge outlet conduits, said valves being optionally opened or closed at any time, d. hot fluid solid particles, in particular catalytic particles inlet and outlet conduits being provided at the upper and lower portion of said heat removal vessel respectively and equipped with valves which function to control the thermal loadage of the external heat removal system within a range of from 0% to 100%.

e. means for the introduction and distribution of a fluidizing gas into the hot fluid solid particles bed, said means being located at the lower portion of said heat removal vessel, and f. a fluidizing gas discharge outlet conduit being located at the upper portion of the external heat removal vessel.

In another aspect, the present invention provides a process for the removal of a portion of thermal energy from hot fluid solid particles, in particular the fluid solid catalytic particles upon which have been surface-deposited deactivating carbonaceous materials when used in a fluid catalytic cracking (FCC) operation and then regenerated in a regeneration vessel by the combustion of carbonaceous deposits or coke with an oxygen containing gas, said process comprising the steps of:

a. introducing into an external heat removal vessel via an inlet conduit at the upper portion of said vessel hot fluid solid particles, in particular the hot catalytic particles from a dense phase bed of said particles that have been regenerated in a regeneration vessel by the combustion of carbonaceous deposits or coke accumulating on the surface thereof, and then discharging the same via an outlet conduit at the lower portion of said vessel, said inlet and outlet conduits being provided with valves which serve as controlling the thermal loadage of the external heat removal vessel within a range of 0% to 100%.

b. introducing a fluidizing gas into said heat removal vessel via a gas inlet conduit at the lower portion of said vessel, thereby forming a dense phase fluidized bed of said catalytic particles fluid-like flowing downwardly, and then discharging the catalytic particles via an outlet conduit at the lower portion of said vessel, and c. introducing the supply water into said external heat removal vessel via an inlet conduit provided with a valve at the upper portion of said vessel, and then discharging the steam formed by indirect heat exchange of said water with the hot particles downwardly flowing in the form of dense phase along one or more separated heat exchange tube units which are substantially vertically suspended from the top and embedded in a dense phase fluidized bed of said hot particles.

The external heat removal apparatus and process thereof in accordance with the present invention may utilize as many external heat removal tube units or bundles independent of one another as required for the maintenance of thermal equilibrium or a constant operation temperature in the catalysis-regeneration cycle of the fluid catalytic cracking (FCC) catalyst. Therefore, the apparatus and process thereof are particularly adequate to an FCC operation. In a preferred embodiment of the present invention, the high temperature regenerated catalytic particles are introduced through an opening at the upper portion of the external heat removal vessel and fluid-like flow downwardly through the shell side passage of said vessel in the form of fluidized dense phase bed which is caused by a fluidizing gas introduced through an opening at the lower portion of said vessel. These particles are cooled and then discharged through an opening at the lower portion of the external heat removal vessel. The catalytic particles inlet and outlet conduits are provided with slide valves which function to control the thermal loadage of the external heat removal system within a range of from 0% to 100%. The heat exchange medium or coolant, preferably water is passed through the tube side passage of as many heat exchange tube units as the heat removal load requires and at the same time the supply water is vaporized into steam during the absorption of a portion of thermal energy from the hot regenerated catalytic particles by indirect heat exchange therewith. The formed steam is discharged through an outlet tube associated with the various heat exchange tube units.

Reference is now made to the attached drawings representing a preferred illustrative embodiment of the present invention. In FIG. 1 is shown a specifically preferential mode of the present invention wherein the hot regenerated catalytic particles are cooled. This type of arrangement shown in accordance with the present invention comprises a shell (6), one or more heat exchange tube units and means for the introduction and distribution of a fluidizing gas. Apart from the unique heat exchange tube units of the present invention and their associations, other parts may be in the conventional forms or provided by the modifications thereof which will be apparent to those skilled in the art. The number of heat exchange tube units to be employed depends on the quantity of thermal energy to be removed or recovered from the hot regenerated catalytic particles.

Each unitary heat exchange tube bundle or heat removal unit comprises a supply water inlet tube (1), a water collecting chamber or cylinder conduit (2), a central casing heat removal tube (4-2) and one or more sideline heat removal tubes (4-1), a steam collecting chamber or cylinder conduit (3) and a steam discharge tube (5), all of which constitute a water-to-steam circulation. These heat exchange tube units may be optionally brought into operation or closed by means of the valves located at the supply water inlet tubes. The shell (6) is made of, for example, steel, closed-ended at the top and bottom and lined with an erosion-resistant refractory and insulating refractory on its interior surface. On this shell are also provided the hot catalytic particles inlet and outlet openings or conduits (7, 8) and the fluidizing gas inlet and outlet openings or conduits (11, 12). In order to maintain a substantially constant circulating flow rate of the water/steam mixture in the various sideline heat removal tubes of each heat removal unit, the ratio of effective flow cross-sectional area A1 of a sideline heat remove tube (4-1) to effective flow circular and cross-sectional area A2 of a central casing heat exchange tube (4-2) should be appropriately selected so that the ratio A1/A2 ranges from about 0.5 to 1.5. Every heat removal tube unit is fixed to the top (10) of shell (6) using a self-supporting construction of a vertical water-cooled wall. The steam discharge tubes are securely weld-fixed to the uppermost portion of the top (10) of the external heat removal vessel. In this preferred arrangement, the steam discharge tube serves as a portion of heat removal unit and at the same time as a supporting means. At an appropriate position of the cylindrical vessel are welded some fixing means or guiding spacers (9) of any suitable forms for limiting any transverse displacement that may occur in a heat exchange operation. A fluidizing gas distributor means (13) is located at an appropriate level of the lower portion of said vessel, said level being able to be conventionally determined by those skilled in the art.

As shown in the attached FIGS. 1-5, the high temperature catalytic particles flow downwardly in the form of a fluidized dense phase bed that is formed by means of a fluidizing gas being upwardly passed through the shell side passage of said external heat exchange vessel. The supply water is passed downwardly through an inlet tube (1) into the water collecting chamber (2) and then flows upwardly through the heat removal tubes (4-1) and (4-2). At the same time, the supply water is transformed into the collecting cylinder conduit chamber (3) in the form of steam. The resulting steam is discharged from the chamber (3) via a discharge tube (5). Up to this moment, all the heat removal operation becomes terminated. The fluidizing gas, which may be air or any other suitable gases, preferably air, is introduced via the inlet opening (11) and enters the external heat removal vessel after being distributed through the fluidizing gas distributor means (13). The solid catalytic particles are fluidized in the form of dense phase by this fluidizing gas which is then discharged via an outlet conduit (12) disposed at the upper portion of the external heat removal vessel. The so-called dense phase is apparent to those skilled in the art.

It is now contemplated that the present invention is particularly utilized in combination with a catalyst regeneration vessel in a fluid catalytic cracking (FCC) operation of heavy straight feedstocks. The cracking reaction vessel, for example a riser type reactor is operated at a pressure in a range of from about 0.08 MPa to about 0.35 MPa and a temperature in a range of from about 450° C. to about 550° C. The quantity of carbonaceous deposits or coke formed on the surface of the catalytic particles during the cracking reactions ranges from about 6.5% to about 15%. The downstream regeneration vessel remotely connected with the reaction vessel is operated at a pressure in a range of from about 0.08 MPa to about 0.35 MPa, a temperature of the dense phase fluidized bed of catalytic particles in a range of from about 650° C. about 760° C. and a density of the dense phase fluidized bed of catalytic particles in a range of from about 200 kg/m³ to 600 kg/m³. The still downstream external heat removal apparatus also remotely connected with the regeneration vessel is operated at a pressure of shell side passage thereof in a range of from about 0.2 MPa to about 0.5 MPa, a temperature of shell side passage thereof in a range of from about 500° C. to about 750° C. and a density of the mixture of catalytic particles/fluidizing gas being downwardly passed through the shell side passage thereof in a range of from about 200 kg/m³ to 600 kg/m³. The apparent velocity of the fluidizing gas being passed through the shell side passage of the external heat removal apparatus ranges from about 0.1 m/s to about 1.0 m/s. The inlet temperature of hot catalytic particles being introduced from the catalyst regeneration vessel into the external heat removal vessel ranges from about 500° to about 750° C. The outlet temperature of cooled catalytic particles ranges from about 460° to about 700° C. The steam formed by the evaporation of the supply water ranges from about 0.6 MPa to about 4.2 MPa.

ILLUSTRATIVE EMBODIMENT OF THE INVENTION

The following shows a typically preferred embodiment of the present invention which is employed in an FCC operation for the external remove of thermal energy from the regeneration vessel. The heat removal arrangement of apparatus is essentially shown in the attached FIGS. 1-5. The operating parameters prevailing in the illustrative embodiment specifically representing the external heat removal apparatus and process thereof of the present invention are listed below.

| | |
|---|---|
| Thermal Loadage, W | $2700 \times 10^4$ |
| Inlet temperature of Catalyst, °C. | 750 |
| Outlet Temperature of Catalyst, °C. | 650 |
| Apparent Velocity of Fluidizing Gas, m/s | 0.4 |
| Pressure of Shell Side Passage, MPa | 0.33 |
| Density of Fluidized Bed, kg/m³ | 400 |
| Pressure of Steam, MPa | 4.2 |
| Overall Heat Transfer Coefficient, W/m².K | 370 |
| Area of Heat Transfer, m² | 170 |
| Number of Tube Units | 22 |
| Area of a Tube Unit, m² | 7.7 |
| Length of Heat Remove Tube, m | 6 |

As described hereinbefore, the external heat remove apparatus and process thereof having an excellent heat removal capacity in accordance with the present invention can be utilized to effectively, stably and flexibly control the operation temperature of fluid catalytic cracking (FCC) effected with heavy feedstock. Due to the use of a plurality of separate heat exchange tube units each of which may be optionally opened and closed at any time, the apparatus and process thereof in accordance with the present invention can be flexibly regulated according to the requirements of different thermal energy removal loads. The attrition upon the heat exchange means and the service life of operation can be substantially improved since the fluid solid particles slowly flow downwardly through the shell side passage of the external heat removal arrangement in the form of dense phase fluidized bed in accordance with the present invention. The high pressure resistance of the unitary heat exchange tubes and the application of self-supporting construction of water-cooled wall as the supporting means thereof result in the economy of the metallic materials and manufacture costs.

It should be understood that the above provided general description and illustrative exemplification of the present invention would not constitute any limitation to the present invention in its broadest sense. In fact, the present invention could be adapted to cool any type fluid solid particles with some modifications which are of course within the extent of protection defined herein below.

What we claim is:

1. An arrangement of apparatus for cooling hot fluid solid particles, said apparatus comprising in combination:
   a. a substantially vertical, cylindrical and closed-ended heat removal vessel,
   b. one or more separate heat exchange tube units being housed in said cylindrical heat removal vessel, each of said heat exchange tube units comprising a supply coolant inlet tube, a supply coolant collecting chamber, one or more heat exchange tubes, a vapor collecting chamber and a resulting vapor discharge tube, all of which constitute a coolant-to-vapor circulation, and in which one of said heat exchange tube units comprises a central casing heat removal tube enclosing said supply coolant inlet tube and one or more sideline heat removal tubes,
   c. control valves being provided at the supply coolant or heat exchange medium inlet and the resulting vapor discharge outlet tubes,
   d. hot fluid solid particles inlet and outlet conduits being provided with control valves,
   e. means for the introduction and distribution of a fluidizing gas into said heat removal vessel, and
   f. a fluidizing gas discharge outlet conduit being located at the upper portion of the heat removal vessel.

2. An arrangement of apparatus according to claim 1 in which the shell of said heat removal vessel is made of steel and lined with an erosion resistant refractory and insulating refractory on the interior surface thereof.

3. An arrangement of apparatus according to claim 1 in which the ratio of effective flow cross-sectional area $A1$ of said single sideline heat removal tube to effective flow circular cross-sectional area $A2$ of said central casing heat removal tube is selected within a range of from about 0.5 to about 1.5.

4. An arrangement of apparatus according to claim 1 in which heat removal tube unit is fixed to the top of said heat removal vessel using a self-supporting construction of a vertical water-cooled wall.

5. An arrangement of apparatus according to claim 4 in which said heat removal tube unit is connected with the top of said heat removal vessel through said vapor discharge tube being securely weld-fixed to the uppermost portion of said heat removal vessel.

6. An arrangement of apparatus according to claim 1 in which a suitable number of guiding spacers for limiting any transverse displacement of said heat exchange tube units are welded at a suitable level of said heat removal vessel.

7. An arrangement of apparatus according to claim 1 in which said supply coolant collecting and resulting vapor collecting chambers are of closed-ended cylinder conduits.

8. An arrangement of apparatus according to claim 1 in which said fluidizing gas is air.

9. An arrangement of apparatus according to claim 1 in which said coolant or heat exchange medium is water.

10. An arrangement of apparatus according to claim 1 in which said hot fluid solid particles are hot fluid catalytic solid particles that have been carbonaceous deposits contaminated on the surface thereof in a fluid catalytic cracking operation and then regenerated in a regeneration vessel by the combustion of said deposits with an oxygen containing gas.

11. An arrangement of apparatus according to claim 1 in which said hot fluid particles flow downwardly in the form of dense phase fluidized bed.

12. An arrangement of apparatus according to claim 1 in which said control valve provided at said coolant inlet and vapor outlet tubes are able to be optionally opened or closed at any time.

13. An arrangement of apparatus according to claim 1 in which said control valves provided at said fluid solid particles inlet and outlet conduits function to regulate the thermal loadage to be removed within a range of from about 0 to about 100%.

14. An arrangement of apparatus according to any one of the preceding claims, being utilized in combination with a regeneration vessel in an FCC operation.

* * * * *

UNITED STATES PATENT AND TRADEMARK OFFICE
CERTIFICATE OF CORRECTION

PATENT NO.  : 5,242,012
DATED       : September 7, 1993
INVENTOR(S) : LAI et al.

It is certified that error appears in the above-identified patent and that said Letters Patent is hereby corrected as shown below:

On the front page, Item [73], "Beijing Design Institute" should read --Beijing Design Institute of SINOPEC--.

Signed and Sealed this

Eighteenth Day of April, 1995

Attest:

BRUCE LEHMAN

Attesting Officer

Commissioner of Patents and Trademarks